(12) United States Patent
Behrendt et al.

(10) Patent No.: US 8,294,593 B2
(45) Date of Patent: Oct. 23, 2012

(54) METHOD AND DATA PROCESSING SYSTEM FOR COLLECTING USAGE DATA OF AN ON-DEMAND SERVICE

(75) Inventors: Michael Behrendt, Randersacker (DE); Gerd Breiter, Wildberg (DE); Andrea Schmidt, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 12/035,508

(22) Filed: Feb. 22, 2008

(65) Prior Publication Data
US 2008/0204271 A1 Aug. 28, 2008

(30) Foreign Application Priority Data
Feb. 23, 2007 (EP) ................................. 07102931

(51) Int. Cl.
*G02B 23/00* (2006.01)
(52) U.S. Cl. ................................. 340/870.02
(58) Field of Classification Search ............ 340/870.02; 709/223, 224, 229; 705/52
See application file for complete search history.

(56) References Cited

U.S. PATENT DOCUMENTS

| 7,702,779 | B1 * | 4/2010 | Gupta et al. | 709/224 |
|---|---|---|---|---|
| 8,010,984 | B2 * | 8/2011 | Thukral | 725/86 |
| 2004/0117311 | A1 * | 6/2004 | Agarwal et al. | 705/52 |
| 2005/0114158 | A1 * | 5/2005 | Albaugh et al. | 705/1 |
| 2006/0140370 | A1 * | 6/2006 | Agarwal et al. | 379/114.28 |
| 2006/0265713 | A1 * | 11/2006 | Depro et al. | 718/104 |
| 2006/0274722 | A1 * | 12/2006 | Polan et al. | 370/352 |

* cited by examiner

*Primary Examiner* — Fritz M Fleming
(74) *Attorney, Agent, or Firm* — William A. Kinnaman, Jr.

(57) ABSTRACT

A method of collecting usage data of an on-demand service provided to a subscriber is disclosed. The method comprises provisioning of a first manageable resource in order to provide the on-demand service to the subscriber, the first manageable resource being associated with at least a first underlying resource, the first underlying resource comprising a first collector for collecting first usage data of the first underlying resource while the on-demand service is provided. Further, a first metering component is instantiated for the first manageable resource and the first metering component is instructed to initiate the retrieval of the first usage data from the first collector prior to the termination of the first metering component and the de-provisioning of the first manageable resource. Additionally, the retrieved first usage data is stored for further evaluation.

15 Claims, 4 Drawing Sheets

METHOD AND DATA PROCESSING SYSTEM FOR COLLECTING USAGE DATA OF AN ON-DEMAND SERVICE

CROSS-REFERENCE TO RELATED APPLICATION

This application claims the priority benefit under 35 U.S.C. §119 of prior European application 07102931.8, filed Feb. 23, 2007, and incorporated herein by reference.

BACKGROUND OF THE INVENTION

1. Field of the invention

The invention relates to a method of collecting usage data of an on-demand service provided to a subscriber. The invention also relates to a computer program product and to a data processing system for collecting usage data of an on-demand service provided to a subscriber.

2. Description of the Related Art

On-demand services are commonly used to provide web based or computer based services to subscribers. For example, a video on-demand service allows its subscribers to select and watch video content over a network as part of an interactive television system. On-demand computing, also known as utility computing, can be understood as the delivery and management of on-demand services whereby computer resources and services are provided on an on-demand and pay-per-use basis. Customers of the on-demand service do not have to invest in owning (peak need) resources anymore as they are only billed for the actual use of resources provided by the on-demand service.

On-demand software, also known as applications on demand or as application services, falls also within the scope of on-demand services. An application service provider provides computer based services to customers over a network, e.g., the Internet. The need for application service providers has evolved from the increasing costs of specialized software that have far exceeded the price range of small- or medium-sized businesses. As well, the growing complexities of software have led to huge costs in distributing the software to end users. Through application service providers, the complexities and costs of such software can be cut down. In addition, the issues of upgrading have been eliminated from the end-firm by placing the onus on the application service providers to maintain up-to-date services, 24/7 technical support, physical and electronic security and inbuilt support for business continuity and flexible working.

In traditional data centers, IT services are deployed on a static set of IT resources—servers, storage, network, and/or applications. The customers of a service or a set of services are charged for the provision of the service. The set of services to be delivered to the customers as well as the capacity required to provide the services are according to traditional accounting negotiated between the service provider and the customer, e.g., at the beginning of the fiscal year. The customer is then charged for the usage of the service, for example on a monthly basis.

Metering which is the process of determining the amount of resources and services used per customer is in these traditional environments performed on a per resource basis, whereby the resource corresponds to the underlying component or set of components adapted to provide the service to the customer. Local instrumentations running on the resource in conjunction with a metering system that collects the usage data for use by the local instrumentation on a regular basis, e.g., once a day, allows one to bill customers based on the collected usage data obtained by the metering system from the underlying resources of the service.

With utility computing, data centers now offer through on-demand management systems a multitude of services to a plurality of subscribers in an 'on demand' fashion. An on-demand service instance is created and managed for a particular subscriber. This process is performed on actual needs of the subscriber rather than being negotiated between the provider and the customer at the beginning of the fiscal year. Each service instance is associated with a set of different underlying resources which actually deliver the service. The subscriber may be charged on a per usage basis, both for the service usage and the usage of the underlying resources. A service instance can be regarded as one or more manageable resources that provide an adaptation of the underlying resources and through which the services provided by the underlying resources can be made available to the subscribers.

An underlying resource might however be reassigned between service instances provided to different subscribers. The switch of an assignment of an underlying resource from one service to another might occur quickly and with a high frequency. The reassignment of an underlying resource therefore specifies additional points in time where metering data should be collected from the underlying resource. These additional points in time are however not taken into account by traditional and established metering systems which collect usage data as mentioned above on a regular basis, e.g., once a day.

Metering data in utility computing environments is required to be collected in the context of the on-demand service instance rather than in the context of the underlying resource as it is done in traditional IT environments.

There is therefore a need for an improved method of collecting usage data of an on-demand service provided to a subscriber. Accordingly, there is a need for an improved data processing system for collecting usage data of an on-demand service provided to a subscriber.

SUMMARY OF THE INVENTION

According to a first aspect of the invention, there is provided a method of collecting usage data of an on-demand service provided to a subscriber. In accordance with an embodiment of the invention, the method comprises the step of provisioning of a first manageable resource in order to provide the on-demand service to the subscriber. The first manageable resource is associated with at most a first underlying resource. The first underlying resource comprises at least a first collector for collecting first usage data of the first underlying resource while the on-demand service is provided. The method in accordance with the invention further comprises the step of instantiating a first metering component for the first manageable resource and the step of instructing the first metering component to initiate the retrieval of the first usage data from the first collector prior to the termination of the first metering component and the de-provisioning of the first manageable resource. In a further step, the retrieved first usage data is stored for further evaluation.

In on-demand management environments, real resources, such as servers, operating systems, network switches, or applications that actually provide the service are represented as stateful web services called manageable resources. A manageable resource is in that sense an adaptation of the underlying resource, whereby an on-demand service is provided. A manageable resource defines thus properties and operations of the underlying resource with respect to the usage in an on-demand service. According to the embodiment of the invention, the first manageable resource represents then the stateful web service of the first underlying resource which is the real resource providing the service to the subscriber. The first underlying resource hosts at least the first collector which collects the first usage data from local instrumentations while the on-demand service is provided. Further, the first metering component, which can be seen as a manageable resource, is instantiated for the first manageable resource. The first metering component is instructed to initiate the retrieval of the first usage data from the first collector before the provision of the service to the subscriber via the first manageable resource is terminated by a de-provisioning of the first manageable resource. The first usage data is then stored for further evaluation, e.g., for billing services.

As the first usage data is retrieved prior to the de-provisioning of the first manageable resource, the first usage data represents a measure for the amount of usage for the resources which have been provided to the subscriber by the first underlying resource during the period of time in which the first underlying resource has been provisioned for the subscriber. The method in accordance with the invention is therefore particularly advantageous as it allows one to charge the subscriber according to the actual amount of resources used and not based on a regular read out of the collector as described in the background section.

In accordance with an embodiment of the invention, the first metering component initiates at least a metering system to retrieve the first usage data from the first collector. The metering system is instructed to read out the first usage data from the first collector and further provides a storage space for storing the first usage data on the metering system. The metering system might correspond to an established metering system such as the IT-Usage and Accounting Manager (ITUAM, for example version 6.1) from IBM Corporation. Such a metering system can be employed to read out the first usage data from the first underlying resource via the first collector. The first collector might in this case be a component of the metering system. The usage of an established metering system provides the advantage that the metering system comprises means for organizing and restructuring the collected data as reporting information that help to track and allocate resources. Furthermore charge back, resource accounting, and shared services billing features are included.

The first metering component provides a link between the first manageable resource and the metering system as the first metering component instructs the metering system to read out the first collector in order to obtain the first usage data for the provision of the on-demand service via the first underlying resource prior to the de-provisioning of the first manageable resource. As mentioned above, established metering systems, such as ITUAM have been employed to collect usage data from the collector on a regular, e.g., daily basis. By the employment of the first metering component, the established metering system is now instructed to read out the corresponding collector whenever the corresponding manageable resource is on the way of being de-provisioned. Thus, the actual usage of the underlying resource with respect to the service is determined. This allows one to charge the subscriber more accurately than before and hence makes the charging of subscribers fairer.

In accordance with an embodiment of the invention, the method further comprises the step of instantiating a second manageable resource when the subscriber requests the on-demand service. The second manageable resource initiates the provision of the first manageable resource. In a further step, a second metering component is instantiated for the second manageable resource. The second metering component is in a further step instructed to collect metering events relating to the provision of the second manageable resource to the subscriber. The collected metering events are then stored, e.g., on the metering system for further evaluation.

A subscription can be represented itself by a manageable resource which corresponds according to the embodiment of the invention to the second manageable resource. The second manageable resource is instantiated when the subscriber requests for the on-demand service. When the second manageable resource is instantiated, a resource tree is built up in order to provide the requested service to the subscriber. The first manageable resource is thus a manageable resource in the resource tree of the on-demand service. The first manageable resource may be reassigned between different subscriptions to adapt to current capacity needs depending on the defined service and service level agreements made with the subscribers.

The first manageable resource might not always be available in the resource tree which is built subsequent to the instantiation of the second manageable resource. The second metering component collects metering events which relate to the addition or to the removal of a manageable resource such as the first manageable resource from the resource tree. The metering events can thereby be provided by an event log interface which is associated with the corresponding metering system. Further, the metering events collected by the second metering component must be correlated with the first usage data collected by the first collector so that the metering events associated with the provision of the subscription or of the manageable resources within the resource tree of the subscription are correlated with the usage data of the underlying resources, e.g., for billing purposes. The metering events collected via the second metering components can therefore be used in order to take into account all the usage data determined for the underlying resources that have contributed to provide the service to the subscriber as all the usage data collected can be identified via the metering events collected by the second metering component.

In accordance with an embodiment of the invention, the method further comprises the step of initiating the provision of a third manageable resource via the second manageable resource in order to provide the on-demand service to the subscriber, the third manageable resource is associated with at most a second underlying resource. The second underlying resource comprises at least a second collector for collecting second usage data of the underlying resource. In a further step, a third metering component is instantiated for the third manageable resource. The method in accordance with the invention further comprises the step of instructing the third metering component to initiate the metering system to retrieve the second usage data prior to the termination of the third metering component and prior to the de-provisioning of the third manageable resource. Furthermore, the method comprises the step of storing the second usage data on the metering system for further evaluation.

As already mentioned above, the resource tree is not a static building but can be extended by further manageable resources such as the third manageable resource. As the usage data, such as the first usage data for the first underlying resource and the second usage data for the second underlying resource, reflect the real usage of the underlying resources with respect to the provision of the service, the subscriber will be charged according to his/her actual usage and not on the basis of a preset agreement.

Furthermore, the method in accordance with the invention is particularly advantageous as the charging is now based on the usage as part of a subscription and not only on the usage of the actual resources that provide the actual service.

In accordance with an embodiment of the invention, the first usage data, the second usage data, and the metering events are correlated with the on-demand service and/or with the subscriber. This allows charging the subscriber according to the actual usage of the on-demand service.

In accordance with an embodiment of the invention, the provisioning and the de-provisioning of the first and/or third manageable resources are initiated by the second metering component. Furthermore, the provisioning and the de-provisioning of the first and/or third manageable resources are registered as metering events. This allows one to later relate the collected first and second usage data with the actual service provided to the corresponding subscriber.

In accordance with an embodiment of the invention, the provisioning and the de-provisioning of the first and/or third manageable resources is processed by an on-demand management system. The provisioning and the de-provisioning of the first and/or third manageable resources are registered as metering events by the on-demand management system and collected by the second metering component from the logged data.

In accordance with an embodiment of the invention, the second metering component instructs the corresponding metering system in response to the de-provisioning of the first and/or third manageable resources to aggregate the first and/or second usage data, to rate the aggregated first and/or second usage data and to store the rated first and/or second usage data. Further, the second metering component instructs the metering system to correlate the aggregated first and second usage data with the corresponding metering events. The metering events can be considered when the first/second usage data is rated and the subscriber can then be charged on the basis of the rated first/and second usage data.

In accordance with an embodiment of the invention, the method comprises initiating the at least one metering system in response to a detected de-provisioning of the first manageable resources to aggregate the first usage data from the first collector. Further, the at least one metering system is initiated to correlate the aggregated first usage data with metering events, the metering events being associated with the provisioning or de-provisioning of the first manageable resource, wherein subscription usage data is generated. In further steps, the metering system is initiated to rate the subscription usage data and to store the subscription usage data.

As mentioned before, established metering systems such as ITUAM comprise already means for organizing and restructuring the collected data, and particularly for aggregating and rating the collected data on the basis of rating tables and accounting codes. As the second metering component registers the metering events as described above, it can be employed to initiate the metering system to prepare the billing for the subscription on the basis of the collected subscription usage data which comprise the merged usage data which have been correlated with the metering events.

In accordance with an embodiment of the invention, the first metering component comprises a first metering capability and at least a first metering adapter and the second metering component comprises a second metering capability and at least a second metering adapter. Correspondingly, the third metering component comprises a third metering capability and at least a third metering adapter. The first metering capability corresponds to an extension of the first manageable resource. Similarly the second metering capability corresponds to an extension of the second manageable resource, and the third metering capability corresponds to an extension of the third manageable resource. The metering capability is therefore employed to extend the corresponding manageable resource with respect to metering. Each of the first, second, and third metering adapters correspond to encapsulations of the metering system to which the adapter is associated with.

According to an embodiment of the invention, the metering capability is attached to the corresponding manageable resource as an aspect of the manageable resource. Thus, the lifetime of the metering capability is the same as the lifetime of the manageable resource it is extending and thus the metering capability is instantiated after provisioning of the manageable resource and terminated with the de-provisioning of the manageable resource.

The metering adapter provides an encapsulation of the corresponding metering system and an interface between the metering capability and therefore decouples the metering capability completely from the metering system. Metering systems can be of different operational types, either procedural (batch-oriented) or autonomous (event driven). Batch-oriented systems operate on a request-response base, meaning the steps required for metering are performed in different subsequent steps. A clear sequence is defined for these steps and parameters are required to execute these steps. Execution of these steps is usually asynchronous. The metering adapter provides the required data for these steps and performs the orchestration. Event driven metering systems act autonomously meaning the request-response pattern is substituted by notification subscription and notification publication. Such metering systems act as notification providers of events to publish the meter data in form of events and notification consumers of these events to log the provided data for later reporting purposes. The metering adapter may then interact with the notification broker to register for event publication and subscription.

In accordance with an embodiment of the invention, the first, second, and third metering components are instructed by a measurement directive, wherein a measurement directive is received by the metering capability of the corresponding first, second, or third metering component and passed to the metering adapter, and wherein the measurement comprises data defining the behavior for the corresponding metering capability and metering adapter. The measurement directive is used to define the behavior of the metering capability and metering adapter to perform metering and accounting for a manageable resource.

According to an embodiment of the invention, a measurement directive is an extensible markup language (XML) document which is split into two main sections, a generic and an adapter specific section. The generic section contains information used by the metering capability and information applicable to all adapters that are associated with the metering capability. The adapter specific section provides instructions for the adapter relating to how the corresponding metering system shall be instructed to read out a specified collector. A measurement directive provides thus policies for the corresponding metering capability and associated adapters through which the behavior of these components is specified.

In accordance with an embodiment of the invention, the data defining the behaviour for the corresponding metering capability and metering adapter provides instructions for the metering capability and/or metering adapter to deploy a collector via a metering system at a specific underlying resource, to collect usage data via the metering system from the collector, to store the collected data, and to arrange the collected data with metering events collected separately for the corresponding subscription. A measurement directive is for example used in order to instruct a metering capability and associated metering adapters to deploy collectors, to obtain the usage data from the collectors, to store the obtained data, to correlate the usage data with collected meter events and so on.

In accordance with an embodiment of the invention, the measurement directive is comprised in an initial order, in a termination order, or in a modification order. The initial order is employed for instantiating the on-demand service to the subscriber. The termination order is employed for terminating the subscription to the subscriber and the modification order is employed for the provision and/or the de-provision of a manageable resource in the resource tree of the on-demand service in order to provide the on-demand service to the subscriber.

According to a second aspect of the invention, there is provided a computer program product for collecting usage data of an on-demand service provided to a subscriber. In accordance with an embodiment of the invention, the computer program product comprises a computer-readable medium (in particular, a tangible medium such as semiconductor memory, magnetic tape, or a magnetic or optical disk) storing computer-executable instructions.

In accordance with an embodiment of the invention, the instructions are adapted to perform the method in accordance with the invention.

In accordance with an embodiment of the invention, the instructions are adapted to perform the steps of provisioning of a first manageable resource in order to provide the on-demand service to the subscriber, wherein the first manageable resource is associated with a first underlying resource, wherein the first underlying resource comprises at least a first collector for collecting first usage data of the first underlying resource while the on-demand service is provided. Furthermore, the instructions are adapted to perform the step of instantiating a first metering component for the first manageable resource and the step of instructing the first metering component to initiate the retrieval of the first usage data from the first collector prior to the termination of the first metering component and the de-provisioning of the first manageable resource. In a further step, the retrieved first usage data for further evaluation are stored.

According to a third aspect of the invention, there is provided a data processing system for collecting usage data of an on-demand service provided to a subscriber.

BRIEF DESCRIPTION OF THE DRAWINGS

In the following embodiments of the invention will be described in greater detail by making reference to the drawings in which.

DETAILED DESCRIPTION

Figure 1:
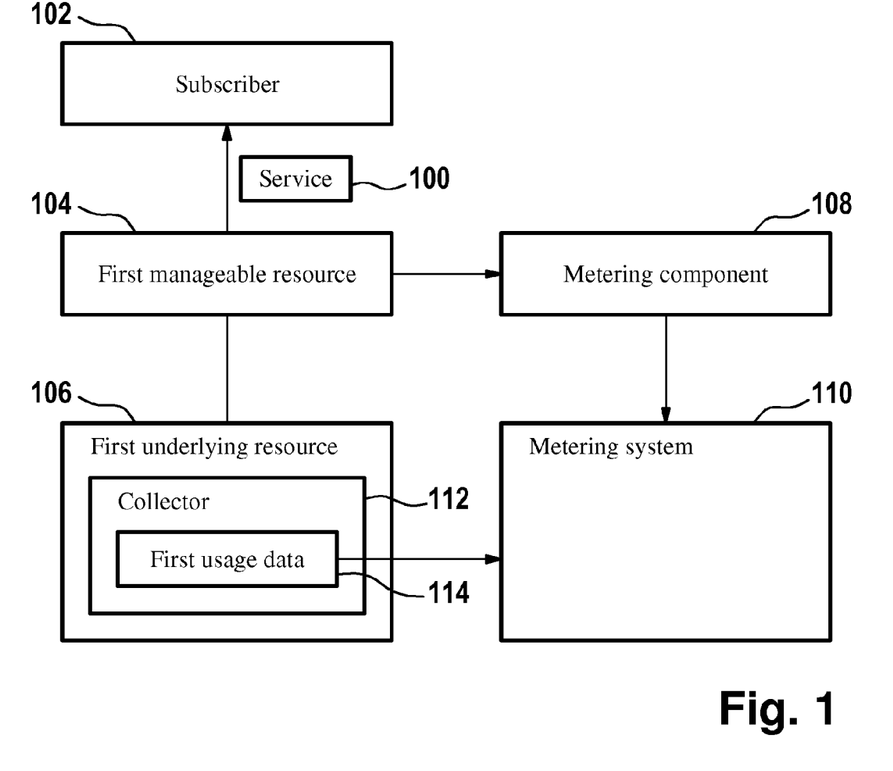
FIG. 1 is a schematic block diagram illustrating the provision of an on-demand service to a subscriber.

FIG. 1 shows schematically a block diagram illustrating the provision of an on-demand service 100 to a subscriber 102. The on-demand service 100 is provided via a first manageable resource 104 to the subscriber 102. The first manageable resource 104 is associated with a first underlying resource 106. The first underlying resource 106 is the 'real' resource that provides the on-demand service 100 to the subscriber 102. The first manageable resource 104 corresponds to a stateful web service which represents the first underlying resource 106. When provisioning the first manageable resource 104 in order to provide the on-demand service 100 to the subscriber, the first manageable resource 104 is extended by a first metering component 108. The first metering component 108 links the first manageable resource 104 with a metering system 110. The metering system 110 is associated with a first collector 112 which can be a component of the metering system 110. The collector 112 is hosted by the first underlying resource 106. The collector is instructed to collect first usage data 114 from the first underlying resource 106 which reflects a measure of the amount of usage of the first underlying resource during the provisioning of the on-demand service 100. The first usage data 114 collected by the collector 112 can be read out by the metering system 110. Before the first manageable resource 104 is de-provisioned (along with a termination of the metering component 108) and thus before the provision of the service 100 through the first underlying resource 106 is stopped, the first metering component 108 instructs the metering system 110 to retrieve the first usage data 114 from the first collector 112. The metering system 110 comprises a storage space (not shown in FIG. 1), wherein the first usage data 114 is stored. The stored usage data 114 can then be rated and the subscriber can be billed in accordance with the rated usage data.

Figure 2:
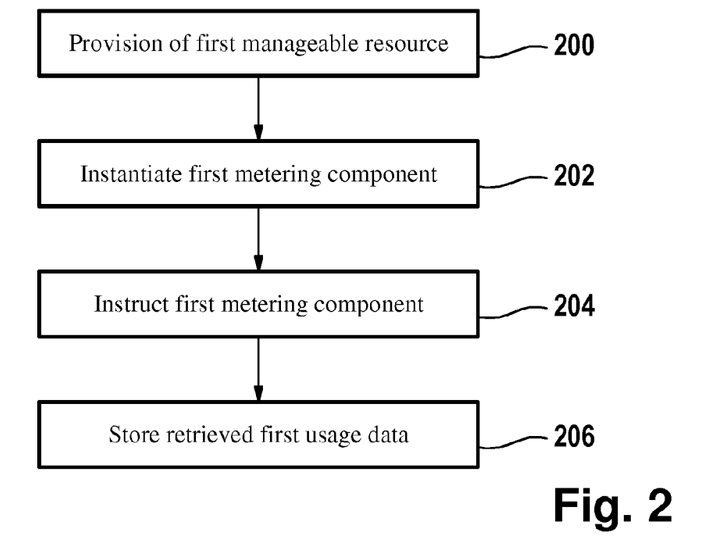
FIG. 2 is a flow diagram illustrating an embodiment of a method of the invention.

FIG. 2 shows a flow diagram illustrating an embodiment of a method in accordance with the invention. In step 200, a first manageable resource is provisioned in order to provide an on-demand service to a subscriber. The first manageable resource is associated with at most a first underlying resource, wherein the first underlying resource is adapted to deliver the on-demand service, and wherein the first underlying resource comprises a first collector for collecting first usage data of the first underlying resource while the on-demand service is provided. In step 202, a first metering component is instantiated for the first manageable resource. In step 204, the first metering component is instructed to initiate the retrieval of the first usage data from the first collector prior to the termination of the first metering component and the de-provisioning of the first manageable resource. In step 206, the retrieved first usage data is stored for further evaluation, so that the subscriber can be charged on the basis of the collected and stored first usage data. The stored retrieved first usage data can have been further correlated with the on-demand service and/or the subscriber.

Figure 3:
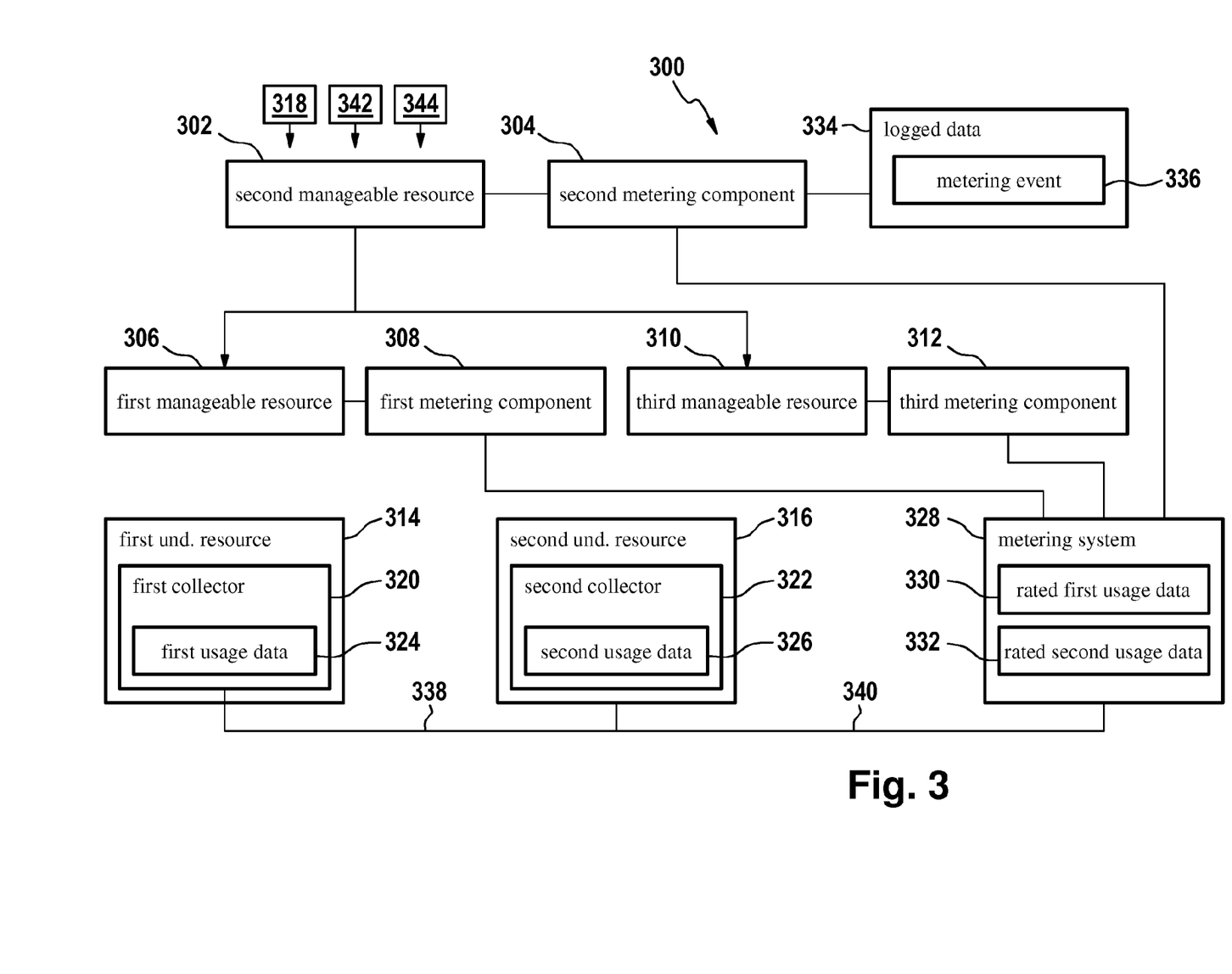
FIG. 3 shows schematically an on-demand service resource tree with metering extensions.

FIG. 3 shows schematically an on-demand service resource tree 300 with metering extensions. A second manageable resource 302 represents the service instance for a subscription which is instantiated when the subscriber requests for the corresponding on-demand service. When the second manageable resource 302 is instantiated, a second metering component 304 is instantiated which corresponds to an extension of the second manageable resource 302 and which is adapted to collect metering events, such as metering event 336 which might relate to the point in time when the on-demand service has been set up for the subscriber. The metering events might be collected via a metering event log interface as part of the on-demand management system. The metering events are then stored in a data base as logged data 334.

The on-demand service 300 is further modeled by a set of manageable resources, such as the first and third manageable resources 306 and 310, wherein each of the manageable resources 306, 310 is associated with a first and/or second underlying resource 314 and 316, respectively. The underlying resources 314 and 316 are the 'real' resources through which the service is actually provided to the subscriber.

The modeling of the on-demand service further comprises a building plan for the instantiation of the service together with the modifications allowed for the service as well as the plan for termination as so called orders. Based on an initial order 318 for the instantiation of the resource tree, the resource tree 300 is built subsequent to the instantiation of the second manageable resource 302. The initial order 318 causes the instantiation of the first manageable resource 306 and of the third manageable resource 310. Further metering events which relate to the points in time when the first and third manageable resources are instantiated are then registered by the second metering component 304.

The initial order 318 causes also the instantiation of a first metering component 308 as well as of a second metering component 312. The first metering component 308 corresponds to an extension of the first manageable resource 306 and provides metering functionality for the first manageable resource 306. Correspondingly, the third metering component 312 corresponds to an extension of the third manageable resource 310 and provides metering capability for the third manageable resource 310. The first metering component 308, the second metering component 304, and the third metering component 312 are linked with a metering system 328.

A first collector 320 is running on the first underlying resource 314 and a second collector 322 is running on the second underlying resource 316. The collectors 320 and 322 are employed to collect usage data of the corresponding underlying resources directly on the resources, e.g., the usage data provided by local instrumentations running on the corresponding underlying resources.

The first collector 320 and the second collector 322 are associated with the metering system 328. The metering system 328 is instructed by the first and second metering components 308, 312 to read out the usage data collected by the first collector 320 and the usage data collected by the second collector 322. The metering system 328 is therefore connected with the collectors through connections 338 and 340. The connections 338 and 340 are, e.g., LAN connections.

The resources used to provide the service to a subscriber might change. For example, the third manageable resource 310 might be de-provisioned while the service is further provided to the subscriber through the first manageable resource 306. In order to de-provision the third manageable resource 310, a modification order 342 is sent to the third manageable resource 310. The third metering component 312 is instructed by the modification order 342 to initiate the metering system 328 to retrieve second usage data 326 via the second collector from the second underlying resource before the third manageable resource 310 is terminated. The second usage data 326 corresponds thereby to the actual usage of the second underlying resource with respect to the provision of the service to the subscriber. The second usage data 326 is then stored on the metering system 328.

In order to completely shut down the provision of the service, the first manageable resource 306 is de-provisioned via a termination order 344. Prior to the de-provisioning of the first manageable resource 306, the first metering component 308 is instructed by the termination order 344 to initiate the metering system 328 to read out first usage data 324 from the first collector and to store the first usage data 324 on the metering system 328. The first usage data 324 corresponds thereby to the actual usage of the first underlying resource 314 with respect to the provision of the service to the subscriber.

The second metering component 304 gets knowledge of the de-provisioning of the first and third manageable resources and generates metering events relating to the points in time when the corresponding manageable resources have been de-provisioned. These metering events are further stored as logged data 334.

The logged data 334 can then be used in order to further evaluate the provision of the service and to generate reports that might be used by the metering system to evaluate the collected first usage data 324 and second usage data 326.

Further, the first usage data 324 and second usage data 326 can be aggregated and rated, whereby rated first and second usage data 330 and 332 is generated. The rated first and second usage data 330 and 332 are then used for billing the subscriber for the on-demand service.

The second metering component 304 can further correlate the logged metering events with the associated first and second usage data 324, 326. The usage data can then be rated with respect to the metering events and will thus be associated with the subscription.

Figure 4:
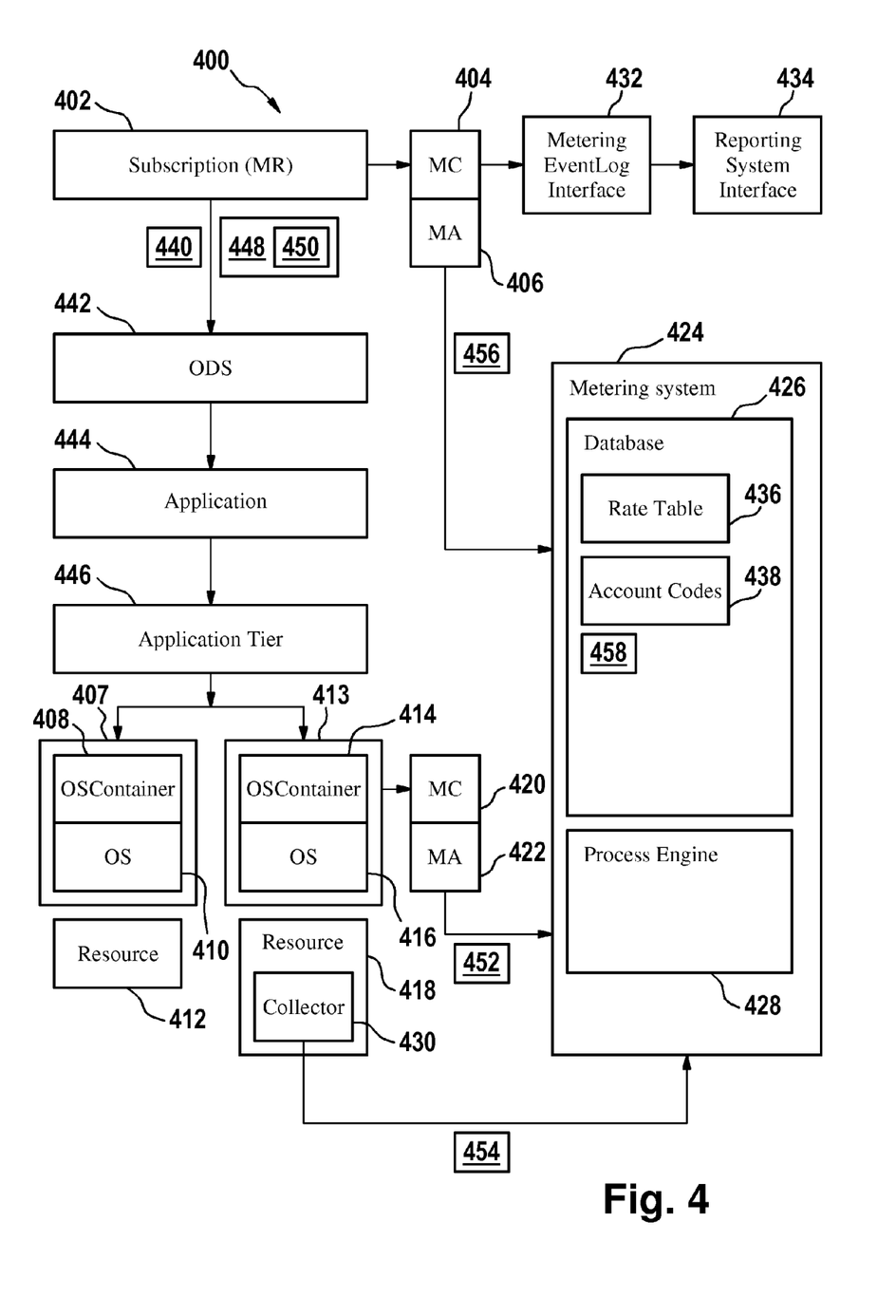
FIG. 4 shows schematically another on-demand service resource tree with metering extensions.

FIG. 4 shows schematically another on-demand service resource tree 400 with metering extensions. The on-demand service provides virtual servers such as virtual servers 407 and 413 via a subscription 402 to a subscriber. Each virtual server 407, 413 is represented through an OS container 408 and 414 and through an operating system 410 and 416. Each virtual server 407 and 413 is associated with an underlying 'real' resource 412 and 418. Each resource 412, 418 hosts a collector of a metering system 424, such as the resource 418 hosts the collector 430.

The subscription 402 is provisioned initially by use of an initial order 440 in order to build up the on-demand service tree 400 for the subscriber so that the subscriber is able to use the servers 407 and/or 413. Along with the subscription 402, a metering capability 404 and a metering adapter 406 are instantiated via the initial order 440 which provide metering functionality for the subscription 402 and which generate metering events, e.g., whenever new manageable resources are provisioned/de-provisioned within the resource tree. The metering events are read out from a metering event log interface 432 and processed by the reporting system interface 434 to generate reports. The metering event log interface might be a component of an on-demand management system that builds up the resource tree 400 for the provision of the subscription.

After the instantiation of the subscription 402, the initial order 440 causes the instantiation of an on-demand service instance 442 with an application 444 that relates to one application tier 446 through which the servers 407 and 413 are provided. The initial order 440 further causes the instantiation of metering capabilities and metering adapters for the virtual servers 407 and 413. For example, the metering capability 420 and the metering adapter 422 are instantiated for the server 413. The metering capability 420 is thereby an extension of the server 413 and is therefore attached to the corresponding manageable resource (the virtual server 413). The metering adapter 422 provides an interface between the metering capability 420 and the metering system 424 and thus decouples the metering capability 420 completely from the metering system.

As mentioned above, the assignment of manageable resources to different subscriptions might change. The server 413 might for example be de-provisioned while the on-demand service is still provided to the subscriber. In order to de-provision the server 413, the subscription 402 receives a modification (de-provisioning) order 448 from the on-demand management system comprising a measurement directive 450. The measurement directive 450 can be implemented as a XML document that comprises data readable by the metering capabilities and the metering adapters and through which the metering capabilities and adapters are instructed to perform metering and accounting of the corresponding management resources.

The de-provisioning order 448 is passed to the application tier 446 for further processing. The measurement directive 450 is read from the metering capability 420. The metering capability 420 invokes the metering adapter 422. The metering adapter then instructs the metering system 424 to read out usage data 454 from the collector. For this, the metering adapter 422 generates a first file 452, e.g. an XML file, which comprises the corresponding instructions and which is sent to the metering system 424.

The metering system comprises a process engine 428. In response to the reception of the first file 452, the process engine 428 starts the collector 430 and thereby obtains the usage data 454 of the resource 418. The usage data 454 is then stored in a database 426 of the metering system.

Subsequently, the virtual server 413 is de-provisioned and the metering capability 420 and metering adapters 422 are terminated. The de-provisioning order 448 flows then back to the subscription 402. The measurement directive 450 further comprises instruction for the metering capability 404 and adapter 406 so that these components collect metering events which relate to the provisioning and de-provisioning of the virtual server 413. Further, the metering adapter 406 creates a second (XML) file 456 which is transferred to the metering system 424. The metering system 424 executes the second file 456 and thereby correlates the collected metering events with the usage data and thereby creates subscription usage data 458 which comprises the aggregated usage data 454 associated with the subscription 402. The subscription usage data 458 is further rated by use of rate tables 436 and accounted by use of account codes 438 that are stored on the database 426. The subscription usage data 458 can then be used for billing purposes.

Figure 5:
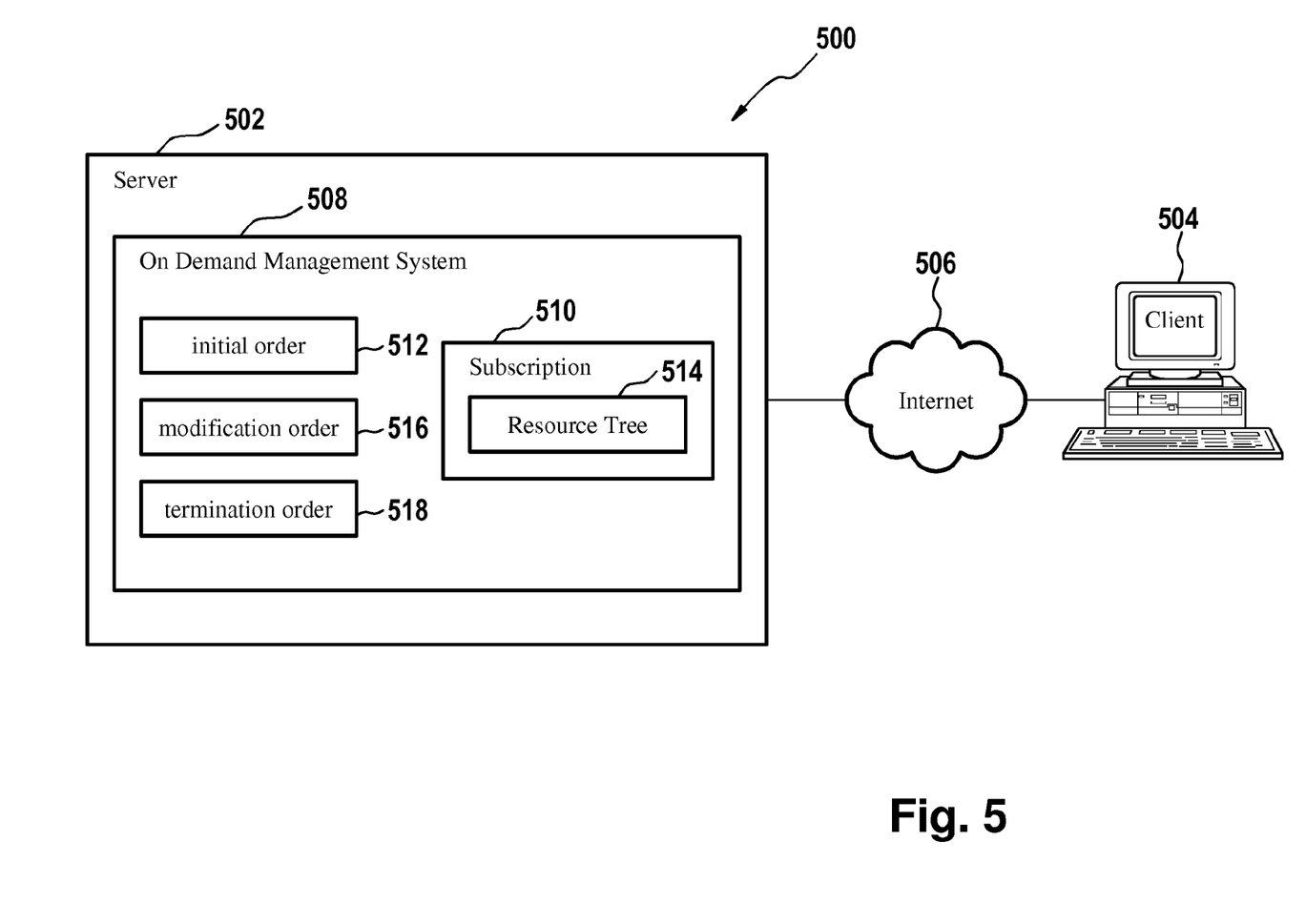
FIG. 5 shows a schematic block diagram of a client-server system.

FIG. 5 shows a block diagram of a client-server system 500. The system 500 comprises a server 502 and a client 504 which are connected with each other over the internet 506. The on-demand management system 508 runs on a server, e.g., on a microprocessor not shown in FIG. 5, through which on-demand services are provided via the internet 506 to the client 504. The client 504 can be regarded as subscriber of the services provided and managed by the on-demand management system 508. When the client 504 contacts the server 502 in order to start its subscription 510, the on-demand management system 508 uses an initial order 512 in order to build up a service/resource tree 514 through which the subscribed service is can be actually provided to the client 504 via the subscription 510. The initial order 512 further comprises instructions to instantiate metering capabilities and metering adapters for manageable resources comprised in the resource tree 514 (cf. on-demand service tree 400 of FIG. 4) and measurement directives in order to instruct the metering capabilities and metering adapters to perform metering as described before. Further, the on-demand management system sends a modification order 516 to the subscription 510 when modifications in the resource tree 514 (provisioning/de-provisioning of manageable resources etc.) shall take place which may also comprise measurement directives for one or more metering capabilities and adapters. Moreover, the on-demand management system 508 employs a termination order 518 to terminate the subscription 510 which also comprises measurement directives, for example, in order to collect usage data of the underlying resources of the resource tree 514, in order to correlate the collected usage data with metering events, and in order to aggregate and rate the collected data.

APPENDIX

List of Reference Numerals

100 On-demand service
102 Subscriber
104 First manageable resource
106 First underlying resource
108 First metering component
110 Metering system
112 First collector
114 First usage data
300 Service resource tree
302 Second manageable resource
304 Second metering component
306 First manageable resource
308 First metering component
310 Third manageable resource
312 Third metering component
314 First underlying resource
316 Second underlying resource
318 Initial order
320 First collector
322 Second collector
324 First usage data
326 Second usage data
328 Metering system
330 Rated first usage data
332 Rated second usage data
334 Logged data
336 Metering event
338 Connection
340 Connection
342 Modification order
344 Termination order
400 On-demand service tree
402 Subscription
404 Metering capability
406 Metering adapter
407 Server
408 OS container
410 Operating system
412 Underlying resource
413 Server
414 OS container
416 Operating system
418 Resource
420 Metering capability
422 Metering adapter
424 Metering system
426 Database
428 Process engine
430 Collector
432 Interface
434 Interface
436 Rate table
438 Account codes
440 Initial order
442 On-demand service instance
444 Application
446 Application tier
448 De-provisioning order
450 Measurement directive 452 First file
454 Usage data
456 Second file
458 Subscription usage data
500 Client-server system
502 Server
504 Client
506 Internet
508 On-demand management system
510 Subscription
512 Initial order
514 Resource tree
516 Modification order
518 Termination order

What is claimed is:

1. A method of collecting usage data of an on-demand service provided to a subscriber, the method comprising:
provisioning a first manageable resource in order to provide the on-demand service to the subscriber, the first manageable resource being associated with a first underlying resource, the first underlying resource comprising a first collector for collecting first usage data of the first underlying resource while the on-demand service is provided;
creating a first metering component for the first manageable resource, wherein a metering system is adapted to read out the first usage data from the first collector, wherein the first metering component initiates the metering system to retrieve the first usage data from the first collector, and wherein the retrieved first usage data is stored on the metering system;
instructing the first metering component to initiate retrieval of the first usage data from the first collector prior to termination of the first metering component and de-provisioning of the first manageable resource;
storing the retrieved first usage data for further evaluation;
creating a second manageable resource when the subscriber requests the on-demand service, the second manageable resource initiating provisioning of the first manageable resource;
creating a second metering component for the second manageable resource;
instructing the second metering component to collect metering events relating to provisioning of the second manageable resource to the subscriber; and
storing the collected metering events on the metering system for further evaluation.

2. The method according to claim 1, further comprising:
initiating provisioning of a third manageable resource by the second manageable resource in order to provide the on-demand service to the subscriber, the third manageable resource being associated with a second underlying resource, the second underlying resource comprising a second collector for collecting second usage data of the second underlying resource;
creating a third metering component for the third manageable resource;
instructing the third metering component to initiate the metering system to retrieve the second usage data prior to termination of the third metering component and prior to de-provisioning of the third manageable resource; and
storing the second usage data on the metering system for further evaluation.

3. The method according to claim 2, wherein the first usage data, the second usage data, and the metering events are correlated with the on-demand service and/or with the subscriber.

4. The method according to claim 2, wherein the provisioning and the de-provisioning of the first and/or third manageable resources is processed by an on-demand management system, and wherein the provisioning and the de-provisioning of the first and/or third manageable resources are registered as metering events by the on-demand management system and collected by the second metering component from the logged data.

5. The method according to claim 2, wherein the second metering component instructs the metering system in response to the de-provisioning of the first and/or third manageable resources to aggregate the first and/or second usage data, to correlate the aggregated first and/or second usage data with metering events, to rate the aggregated first and/or second usage data and to store the rated first and/or second usage data, wherein the metering events are collected from the logged data.

6. The method according to claim 2, wherein the first metering component comprises a first metering capability and a first metering adapter, wherein the second metering component comprises a second metering capability and a second metering adapter, wherein the third metering component comprises a third metering capability and a third metering adapter, wherein the first, second and third metering capabilities correspond to an extension of the first, second, and third manageable resources, respectively, and wherein the first, second, and third metering adapters correspond to encapsulations of the one metering system.

7. The method according to claim 6, wherein the first, second, and third metering components are instructed by a measurement directive, wherein a measurement directive is received by the metering capability of the corresponding first, second, or third metering component and passed to the metering adapter, and wherein the measurement directive comprises data defining behavior for the corresponding metering capability and metering adapter.

8. The method according to claim 7, wherein the data defining the behavior for the corresponding metering capability and metering adapter provides instructions for the metering capability and/or metering adapter to deploy a collector via a metering system at a specific underlying resource, to collect data via the metering system from the collector, to store the collected data, and to correlate the collected data with metering events collected separately for a corresponding subscription.

9. The method according to claim 8, wherein the measurement directive is comprised in an initial order, in a termination order, or in a modification order, wherein the initial order is employed for creating the on-demand service of the subscriber, wherein the termination order is employed for terminating the on-demand service of the subscriber, and wherein the modification order is employed for the provisioning and/or de-provisioning of a manageable resource or to collect data for the subscription.

10. A computer program product for collecting usage data of an on-demand service provided to a subscriber, the computer program product comprising a computer-readable medium storing computer-executable instructions, the instructions being adapted to perform the steps:
provisioning a first manageable resource in order to provide the on-demand service to the subscriber, the first manageable resource being associated with a first underlying resource, the first underlying resource comprising a first collector for collecting first usage data of the first underlying resource while the on-demand service is provided;

creating a first metering component for the first manageable resource, wherein a metering system is adapted to read out the first usage data from the first collector, wherein the first metering component initiates the metering system to retrieve the first usage data from the first collector, and wherein the retrieved first usage data is stored on the metering system;

instructing the first metering component to initiate retrieval of the first usage data from the first collector prior to termination of the first metering component and de-provisioning of the first manageable resource;

storing the retrieved first usage data for further evaluation;

creating a second manageable resource when the subscriber requests the on-demand service, the second manageable resource initiating provisioning of the first manageable resource;

creating a second metering component for the second manageable resource;

instructing the second metering component to collect metering events relating to provisioning of the second manageable resource to the subscriber; and storing the collected metering events on the metering system for further evaluation.

11. The computer program product according to claim 10, the instructions being further adapted to perform the steps:

initiating a metering system in response to a detected de-provisioning of the first manageable resource to collect the first usage data by the first collector;

initiating the metering system to correlate the aggregated first usage data with metering events, the metering events being associated with the provisioning and de-provisioning of the first manageable resource, wherein subscription usage data is generated;

initiating the metering system to rate the subscription usage data; and initiating the metering system to store the subscription usage data.

12. The computer program product according to claim 11, the instructions being further adapted to perform the steps:

sending a first measurement directive via the second manageable resource to the first metering component when provisioning the first manageable resource, the first measurement directive comprising first data defining the behavior of the first metering component, the first data comprising instructions for assigning the first metering component to the first manageable resource and providing specifications for interacting with the metering system; and sending a second measurement directive comprising second data via the second manageable resource to the first metering component prior to the de-provisioning of the first manageable resource, the second data comprising instructions for the metering component to initiate the readout of the first usage data by the metering system.

13. A data processing system for collecting usage data of an on-demand service provided to a subscriber, the system comprising:

means for provisioning a first manageable resource in order to provide the on-demand service to the subscriber, the first manageable resource being associated with a first underlying resource, the first underlying resource comprising a first collector for collecting first usage data of the first underlying resource while the on-demand service is provided;

means for creating a first metering component for the first manageable resource;

means for instructing the first metering component to initiate retrieval of the first usage data from the first collector prior to termination of the first metering component and de-provisioning of the first manageable resource;

means for storing the retrieved first usage data for further evaluation;

a metering system, wherein the metering system is adapted to read out the first usage data from the first collector, wherein the first metering component is adapted to initiate the metering system to retrieve the first usage data from the first collector, and wherein the metering system comprises a storage for storing the first usage data;

means for creating a second manageable resource when the subscriber requests the on-demand service, the second manageable resource being adapted to initiate provisioning of the first manageable resource;

means for creating a second metering component for the second manageable resource;

means for instructing the second metering component to collect metering events relating to provisioning of the second manageable resource to the subscriber; and means for storing the collected metering events on the metering system for further evaluation.

14. The system according to claim 13, further comprising:

means for retrieving registered meter events for provisioning and/or de-provisioning of the first manageable resource by the second metering component.

15. The system according to claim 13, further comprising:

means for sending a first measurement directive via the second manageable resource to the first metering component when provisioning the first manageable resource, the first measurement directive comprising first data defining the behavior of the first metering component, the first data comprising instructions for assigning the first metering component to the first manageable resource and providing specifications for interaction of the first metering component with the metering system; and means for sending a second measurement directive comprising second data via the second manageable resource to the first metering component prior to the de-provisioning of the first manageable resource, the second data comprising instructions for the metering component to initiate the readout of the first usage data by the metering system.

* * * * *